United States Patent [19]  
Ariizumi et al.

[11] Patent Number: 4,765,370  
[45] Date of Patent: Aug. 23, 1988

[54] DIRECTIONAL CONTROL VALVE

[75] Inventors: Ryozo Ariizumi, Urawa; Masakuni Kainuma; Sohji Suda, both of Ohmiya; Toshikazu Aoki, Kawagoe; Masao Kojima; Takashi Ejiri, both of Tokyo, all of Japan

[73] Assignee: Fujikura Rubber Ltd., Tokyo, Japan

[21] Appl. No.: 933,849

[22] Filed: Nov. 24, 1986

[30] Foreign Application Priority Data

Nov. 29, 1985 [JP] Japan ................ 60-183718  
Jun. 30, 1986 [JP] Japan ................ 61-100742

[51] Int. Cl.⁴ .................................. F15B 13/02  
[52] U.S. Cl. .................. 137/625.65; 137/596.17; 137/625.44; 137/870  
[58] Field of Search ........... 137/596.17, 625.44, 137/625.65, 870; 251/129.2

[56] References Cited

U.S. PATENT DOCUMENTS 2,961,002 11/1960 Gordon .  
3,238,398 3/1966 Trbovich et al. .  
3,415,283 12/1968 Trbovich et al. .  
3,532,121 10/1970 Sturman et al. .  
4,074,701 2/1978 Kemmler ............. 137/625.66  
4,516,604 5/1985 Taplin .............. 137/596.15  
4,516,605 5/1985 Taplin ............ 137/596.17 X  
4,540,020 9/1985 Taplin .............. 137/596.15  
4,574,841 3/1986 Hugler ............. 137/625.44

FOREIGN PATENT DOCUMENTS 1500185 12/1969 Fed. Rep. of Germany .

Primary Examiner—Gerald A. Michalsky  
Attorney, Agent, or Firm—Beveridge, DeGrandi & Weilacher

[57] ABSTRACT

A fluid directional control valve having a valve housing with valve chamber therein, an elastic seal ring for sealing the valve chamber, valve ports provided in the housing and connected to the valve chamber, a valve arm having valve bodies and swingably supported in and by the seal ring, and an actuator for actuating the valve arm, so that the valve bodies selectively open and close the valve ports in order to control the fluid connection between the valve ports, in accordance with the swing movement of the valve arm.

9 Claims, 5 Drawing Sheets

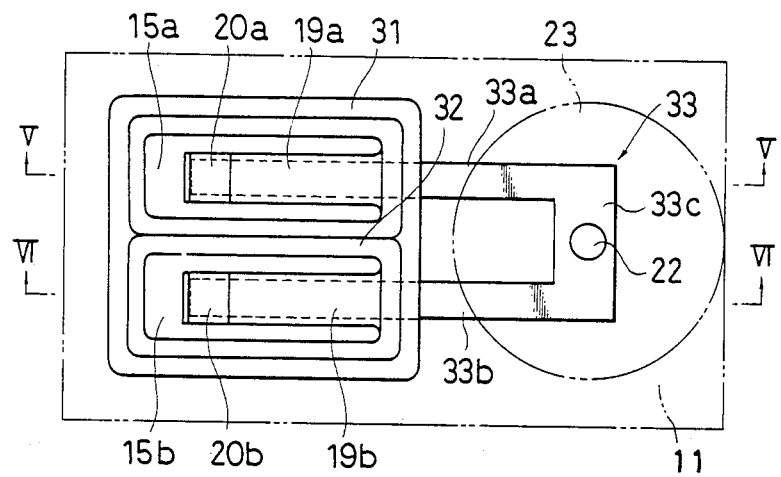
_Fig-4_
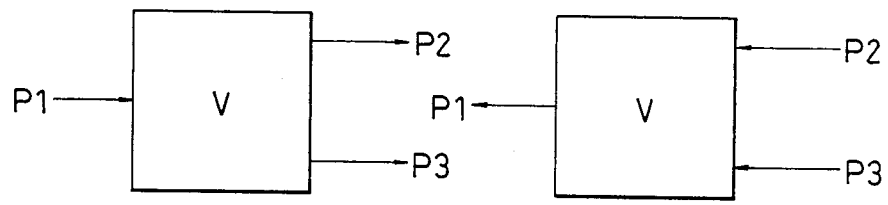
_Fig-11a_  _Fig-11b_

DIRECTIONAL CONTROL VALVE

BACKGROUND OF THE INVENTION

1. Field of the Invention

The present invention relates to a directional control valve and in particular it relates to a multiway-multiport type of fluid directional control valve.

2. Description of the Related Art

A known two way-three port directional control valve which usually has one open inlet port and two outlet ports which can be selectively connected to the inlet port or two inlet ports and one open outlet port to which the inlet ports can be selectively connected is actuated by a spool or a diaphragm which is, however, rather complex in construction and expensive.

The primary object of the present invention is therefore to provide a simple, reliable and inexpensive directional control valve which uses neither spool nor diaphragm.

Another object of the present invention is to provide a multiway-multiport directional control valve unit which can control a plurality of valve ports at one time by a single actuator.

SUMMARY OF THE INVENTION

In order to achieve the objects mentioned above, according to the present invention, there is provided a directional control valve having a valve housing which has a sealed valve chamber therein, an elastic seal member which is located in the valve housing to seal the valve chamber, and a valve arm which is swingably held in and by the seal member and which has, at its front end, valve bodies. The valve chamber has three valve ports connected thereto, one of which is permanently open and the remaining two ports being selectively opened and closed by means of the valve bodies which can be actuated by an actuator, so that the two valve ports can be selectively connected to the permanently open port.

With this arrangement of the present invention, the construction can be simplified and has no sliding portion, so that the control of the valve ports can be reliably and smoothly carried out.

The above mentioned directional control valves can be combined to realize a directional control valve unit which can control multiple valve ports (more than two) at one time by a single common actuator.

BRIEF DESCRIPTION OF THE DRAWINGS

The present invention will be described in detail below with reference to the accompanying drawings, in which:

FIG. 4 is a plan view of a directional control valve according to another embodiment of the present invention;

FIGS. 11(a) and 11(b) are block diagrams showing a principle of a directional control valve in two different modes.

DESCRIPTION OF PREFERRED EMBODIMENTS OF THE INVENTION

FIGS. 11(a) and 11(b) show two operation modes of a fluid directional control valve to which the present invention is directed. In FIG. 11(a), the directional control valve V has one inlet open port P1 and two outlet ports P2 and P3 which are selectively connected to the inlet port P1. On the other hand, in FIG. 11(b), the valve V has two inlet ports P2 and P3 and one outlet port P1 to which the two inlet ports can be selectively connected.

Figure 1:
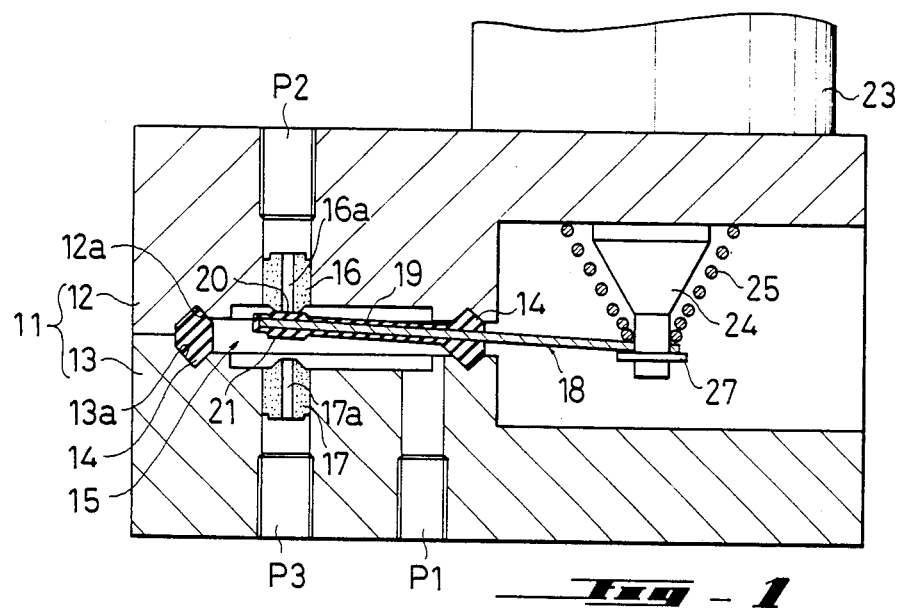
FIG. 1 is a sectional view of a directional control valve according to the present invention.
Figure 2:
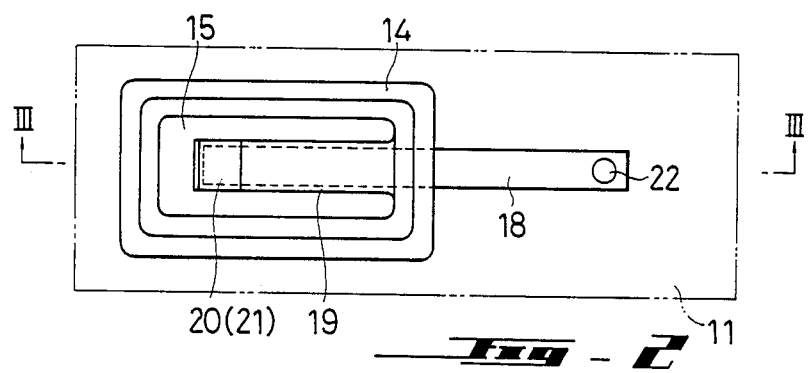
FIG. 2 is a plan view of a directional control valve which has a seal ring and a valve arm, but with a removed valve housing.
Figure 3:
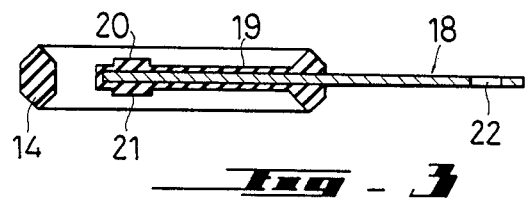
FIG. 3 is a sectional view taken along the line III—III in FIG. 2.

In FIGS. 1 to 3 showing one embodiment of the present invention, the valve has a valve housing 11 consisting of an upper valve housing 12 and a lower valve housing 13. Between the upper and lower valve housings 12 and 13 is provided a valve chamber 15 which is sealed by a seal ring 14 located between the upper and lower housings 12 and 13. The seal ring 14 is made of an elastic material, such as rubber and is preferably convexed at its upper and lower edges to ensure the airtightness thereof, as shown in FIGS. 1 and 3. The upper and lower valve housings 12 and 13 are provided with annular concave recesses 12a and 13a complementary to the corresponding convex projections of the elastic seal ring 14, so that the seal ring 14 can be fitted in the concave recesses 12a and 13a, respectively.

In the illustrated embodiment, the seal ring 14 is generally of annular rectangle in plan view, as shown in FIG. 2. However, the shape of the seal ring 14 in plan view is not limited to such an annular rectangle, and may be of any closed loop, such as circle or ellipse. The elastic seal ring 14 is compressed by a predetermined amount by the upper and lower valve housings 12 and 13 when the valve housings are firmly connected to each other.

The upper valve housing 12 has therein a high pressure valve port (selection port) P2, and the lower valve housing 13 has therein a low pressure port (selection port) P3 which is opposed to the high pressure port P2 of the upper housing 12. The lower valve housing 13 has additionally an open port P1. The three ports P1, P2 and P3 open all into the valve chamber 15.

At the connections between the port P2 and the sealed valve chamber 15 and between the port P3 and the sealed valve chamber 15 are provided valve seats 16 and 17, in the ports P2 and P3, respectively. The valve seats 16 and 17 has fluid passages 16a and 17a therein, respectively, to establish a fluid connection between the respective ports P2 and P3 and the sealed valve chamber 15.

The valve seats 16 and 17 slightly project into the sealed valve chamber 15.

A valve arm 18 is swingably supported in and by the seal ring 14, preferably at the center of the seal ring 14 in the thickness direction, so that the valve arm 18 can swing about the center of seal ring 14. The portion of the valve arm 18 that extends in the sealed valve chamber 15 is sheathed with an cemented outer cover layer 19 made of the same elastic material as the elastic seal ring 14, on the entire surface of the valve arm 18 of that portion. The outer layer 19 can be made as a part of the seal ring 14, during molding of the seal ring 14. Namely, the outer layer 19 and the seal ring 14 can be molded at one time, with the valve arm 18, in an insert molding process. The valve arm 18 has upper and lower valve bodies 20 and 21 at its front or inner end. The valve bodies 20 and 21 can be made by partially raising the outer layer 19 of the valve arm 18 on the upper and lower surfaces of the latter. The valve bodies 20 and 21 are opposed to the corresponding valve seats 16 and 17 of the ports P2 and P3 to selectively open and close the fluid passages 16a(P2) and 17a(P3), respectively.

With the molded outer layer 19 of the valve arm 18 integral with the seal ring 14, a highly sealed cementing between the valve arm 18 and the seal ring 14 which serves as a fulcrum of the seesaw movement of the valve arm 18 can be established. Even if a slight gap produces between the valve arm 18 and the seal ring 14 in which the valve arm is inserted at the connection therebetween, due to a failure of cementing or aging, the gap does not have any adverse influence on the seal effect of the valve chamber 15.

The portion of the valve arm 18 that projects outward from the seal ring 14 has a connecting hole 22 in which a plunger 24 of a solenoid actuator 23 which moves the plunger 24 up and down in FIG. 1 is connected. The solenoid actuator 23 which per se is well known has an electromagnetic coil (not shown) which is energized to move (retract) the plunger 24 against a return spring 25. The plunger 24 is moved downward in FIG. 1 by the return spring 25 when the solenoid actuator 23 is deenergized.

As can be seen from the foregoing, the valve arm 18 swings in the clockwise direction in FIG. 1, with the help of the return spring 25 when the solenoid actuator 23 is deenergized, so that the upper valve body 20 comes into contact with the upper valve seat 16 to close the valve port P2 and the lower valve body 21 comes away from the lower valve seat 17 to open the port P3. Consequently, the fluid connection is established between the port P3 and the port P1.

On the contrary, when the solenoid actuator 23 is energized, the solenoid plunger 24 is retracted against the return spring 25, so that the swing movement of the valve arm 18 in the counterclockwise direction in FIG. 1 takes place. This swing movement of the valve arm in the counterclockwise direction causes the lower valve body 21 to come into contact with the lower valve seat 17 and causes the upper valve body 20 to separate from the upper valve seat 16. Consequently, the fluid connection between the port P3 and the port P1 is broken and the port P1 comes into communication with the port P2. In this way, the ports P2 and P3 can be selectively connected to the port P1 by the solenoid actuator 23.

In FIG. 1, the numeral 27 designates a retainer connected to the solenoid plunger 24 to prevent it from separating from the valve arm 18.

Figure 5:
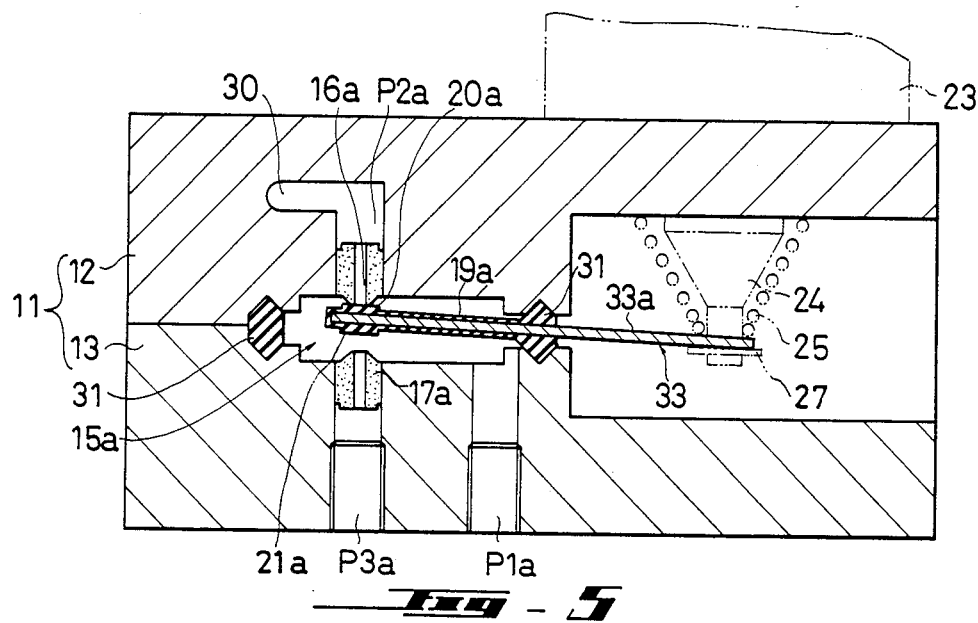
FIGS. 5 and 6 are sectional views taken along the lines V—V and VI—VI in FIG. 4.
Figure 6:
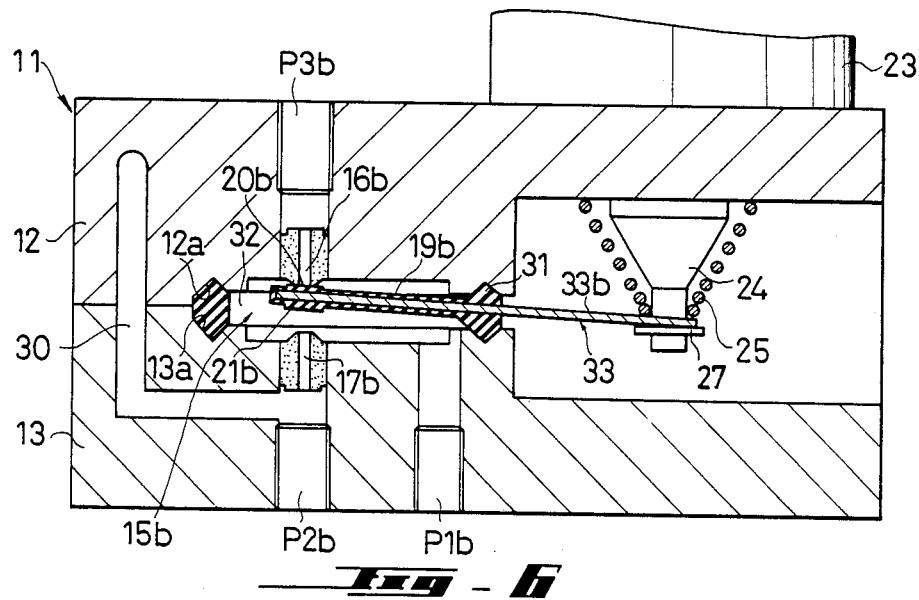

FIGS. 4 to 6 show a different embodiment of the present invention, in which a pair of sealed valve chambers 15a and 15b are located side by side in plan view. Each of the valve chambers 15a and 15b has one open port and two selection ports (high pressure port and low pressure port), similarly to the arrangement illustrated in FIGS. 1 to 3.

Elements corresponding to those of the first embodiment shown in FIGS. 1 to 3 are designated by the same numerals with affixes a and b for the valve chambers 15a and 15b, respectively.

One of the most significant features of the second embodiment shown in FIGS. 4 to 6 is a single common valve arm 33. An elastic annular seal ring 31 which is generally rectangular in plan view has a separation rib 32 which defines separate valve chambers 15a and 15b at the middle portion of the rectangle.

The sealed valve chamber 15a (15b) has one open port P1a (P1b), high pressure port P2a (P2b), and low pressure port P3a (P3b), connected thereto, similarly to the first embodiment mentioned above. In the embodiment shown in FIGS. 4 to 6, the location of the ports P2a and P3a of the valve chamber 15a is opposite to that of the valve chamber 15b. Namely, for the valve chamber 15b, the low pressure port P3b is provided in the upper valve housing 12 and the high pressure port P2b is provided in the lower valve housing 13, contrary to the arrangement of those for the valve chamber 15a, as can be seen from FIGS. 5 and 6. The high pressure port P2a is connected to the high pressure port P2b by means of a connecting passage 30 which is formed in the valve housings 12 and 13.

The valve arm 33 is generally U-shaped in plan view, having a pair of parallel leg portions 33a and 33b, and a web portion 33c connecting the leg portions. The leg portions 33a and 33b are inserted in the seal ring 31 at the center of the seal ring in the thickness direction, so that the leg portions 33a and 33b can swing about the intersections of the leg portions and the seal ring 31. The portions of the leg portions 33a and 33b that project into the sealed valve chambers 15a and 15b are sheathed with outer cover layers 19a and 19b made of the same elastic material as the elastic seal ring 31 and have the valve bodies 20a, 20b and 21a and 21b which can be formed as raised parts of the outer cover layers, similarly to the first embodiment illustrated in FIGS. 1 to 3.

The web portion 33c of the valve arm 33 has, at its center portion, a connecting hole 22 in which the plunger 24 of the solenoid actuator 23 is inserted and connected.

With the arrangement illustrated in FIGS. 4 to 6, when the solenoid actuator 23 is deenergized, as shown in FIG. 5, the permanently open port P1a of the sealed valve chamber 15a is connected to the low pressure port P3a, and the open port P1b in the sealed valve chamber 15b is connected to the high pressure port P2b. On the other hand, when the solenoid actuator 23 is energized, the open port P1a in the valve chamber 15a is connected to the high pressure port P2a, and the open port P1b in the valve chamber 15b is connected to the low pressure port P3b.

It should be noted here that the arrangement of the three ports P1a (P1b), P2a (P2b), and P3a (P3b) are not limited to the illustrated arrangement, and can be modified, so that, for example the high pressure port P2b is provided in the upper valve housing 12, instead of in the lower valve housing 13 and the low pressure port P3b is provided in the lower valve housing 11, instead of in the upper valve housing 11. In this alternative, the arrangement of the three ports P1a, P2a and P3a for the valve chamber 15a is quite the same as that for the valve chamber 15b.

Figure 7:
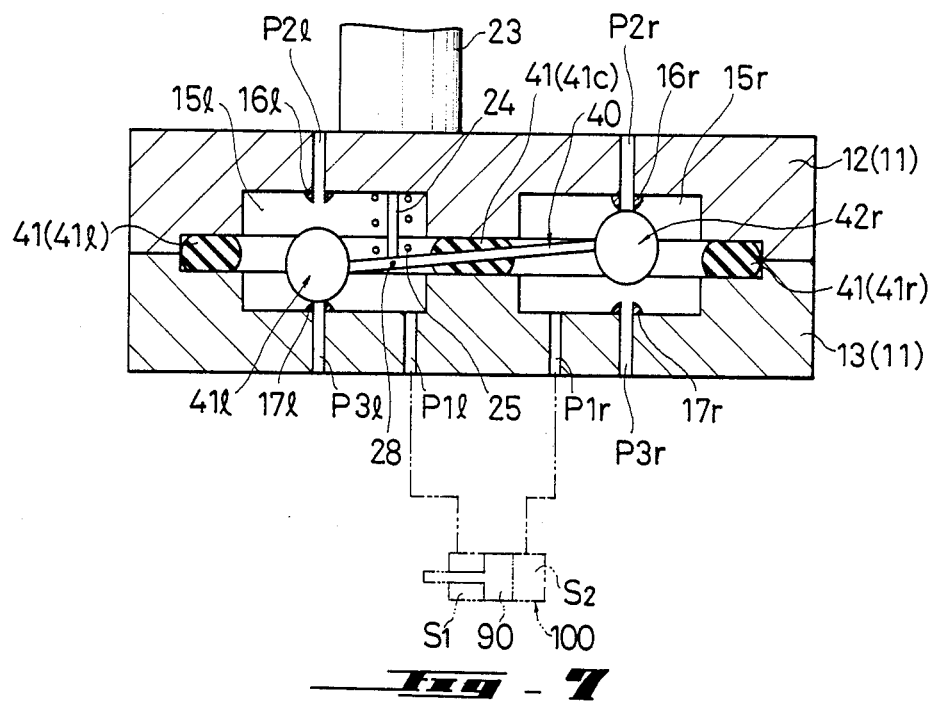
FIG. 7 is a longitudinal sectional view of a directional control valve according to still another embodiment of the present invention.
Figure 8:
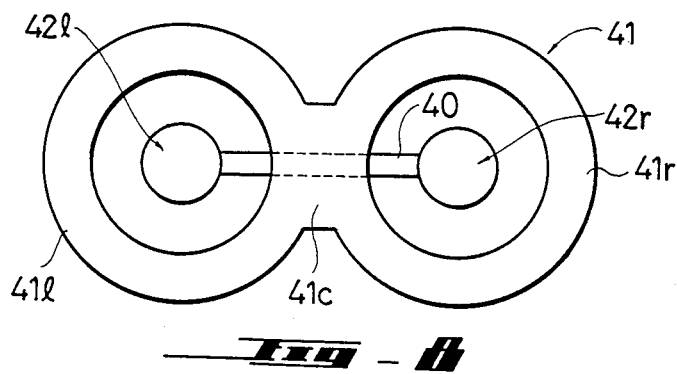
FIG. 8 is a plan view of a seal ring shown in FIG. 7.

FIGS. 7 and 8 show a still another (third) embodiment of the present invention.

In the third embodiment, the valve arm 40 extends in the two valve chambers 15*l* and 15*r* in a side by side arrangement. The seal ring 41 has a profile like a frame of glasses, in which two continuous circular rings 41*l* and 41*r* corresponding to the valve chambers 15*l* and 15*r* are connected to each other by a connecting portion 41*c*. In the third embodiment shown in FIGS. 7 and 8, elements corresponding to those in the first embodiment shown in FIGS. 1 to 3 are designated by the same numerals with affixes l and r, for the valve chambers 15*l* and 15*r*, respectively.

The straight rod like valve arm 40 is inserted in the connecting portion 41*c* of the seal ring 41 at the center of the connecting portion 41*c* in the thickness direction. The valve arm 40 has, at its opposite ends, spherical or ellipsoidal valve bodies 42*l* and 42*r* in the valve chambers 15*a l* and 15*b*, respectively. The valve bodies 42*l* and 42*r* selectively come into contact with the valve seats 16*l* and 17*l*, or 16*r* and 17*r*, in accordance with the swing movement of the valve arm 40 about the connecting portion 41*c* of the seal ring 41. In the embodiment illustrated in FIGS. 7 and 8, no coating layer is provided on the valve arm 40, unlike the embodiments mentioned before. Alternatively, it is also possible to sheathe the valve arm 40 with an elastic outer cover layer, similar to the first or second embodiment mentioned above. The valve arm 40 is connected to the solenoid plunger 24 of the solenoid actuator 23, as designated by the numeral 28 in FIG. 7. It is also possible to connect the valve arm 40 to the solenoid plunger 24 in the valve chamber 15*r*, instead of in the valve chamber 15*l*.

With this arrangement of the third embodiment illustrated in FIGS. 7 and 8, when the solenoid actuator 23 is energized (see FIG. 7), the open port P1*l* in the valve chamber 15*l* is connected to the low pressure valve port P3*l*, and the open valve port P1*r* in the valve chamber 15*r* is connected to the high pressure valve port P2*r*. On the other hand, when the solenoid actuator 23 is deenergized, the fluid connection between the open valve port P1*l* and the high pressure valve port P2*l* is established in the valve chamber 15*l*, and the fluid connection between the open valve port P1*r* and the low pressure valve port P3*r* is established in the valve chamber 15*r*, as shown in FIG. 7.

It should be appreciated that the term "annular" referred to in the specification (e.g. annular seal ring) means a closed loop, and not limited to a circle. The same is applicable also to the annular portions 41*l* and 41*r* of the seal ring 41, so that they can be of any closed loop shape.

The open ports P1*l* and P1*r* can be connected to a couple of opposed cylinder chambers S1 and S2 of a double acting piston device 100 in order to move a piston 90 in opposite directions, as designated by phantom lines in FIG. 7.

The positional relationship between the high pressure port P2*l* (P2*r*) and the low pressure port P3*l* (P3*r*) can be inverted, as mentioned before with reference to the first or second embodiment.

Figure 9:
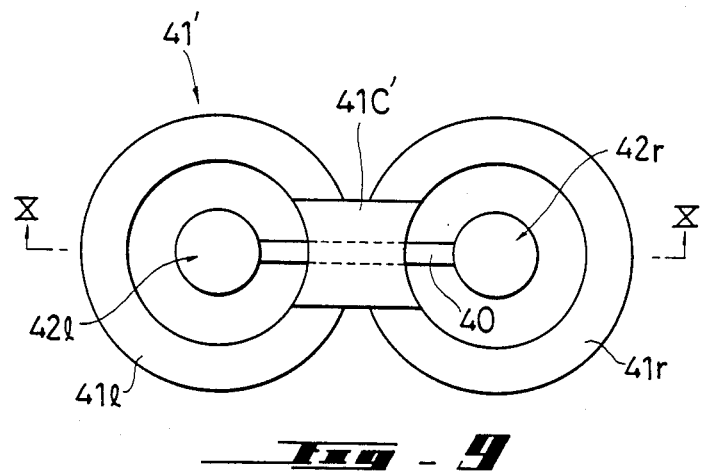
FIG. 9 is a plan view of a variant of a seal ring shown in FIG. 7.
Figure 10:
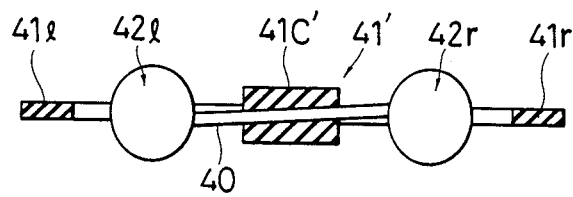
FIG. 10 is a sectional view taken along the line X—X in FIG. 9.

FIGS. 9 and 10 show a variant of the seal ring 41', in which the connecting portion 41*c*' which connects the two annular circle portions 41*l* and 41*r* has a larger thickness than that of the remaining portion of the seal ring 41'. The valve arm 40 is inserted in the thicker connecting portion 41*c*' for swing movement thereabout.

With this arrangement shown in FIGS. 9 and 10, the thicker connecting portion 41*c*' ensures a reliable swing movement of the valve arm 40. It goes without saying that the contacting surfaces of the upper and lower valve housings 12 and 13 (e.g. see FIG. 7) are provided with stepped portions corresponding to the step between the connecting portion 41*c*' and the ring portions 41*l* and 41*r*.

Furthermore, the connecting portion 41*c*' has, preferably, a smaller width, when viewed in the longitudinal direction of the valve arm 40, so that the arm 40 can be actuated with a decreased energy of the solenoid actuator.

I claim:

1. A directional control valve comprising upper and lower valve housings opposed and connected to each other to define a pair of valve chambers therebetween, each having three ports consisting of one permanently open port provided in one of the upper and lower valve housings and opposed two selection ports which are provided in the upper and lower valve housing, an elastic seal ring provided between the upper and lower valve housings about the periphery of each chamber to seal the valve chambers, a common valve arm which has two valve bodies in the respective valve chambers and which is pivotably supported in and by a portion of the periphery of said seal ring, so that the valve bodies selectively open and close the selection ports in the respective valve chambers, in accordance with the swing movement of the valve arm, said valve arm also having two parallel legs which extend in the respective valve chambers, with the portion of said parallel legs extending into the respective valve chambers being sheathed with an integral portion of the material comprising said seal ring, and a connecting web portion which connects the legs outside the valve chambers and which is connected to an actuator, said legs and connecting web forming a unitary and integral body, said housing having formed therein a clearing space which allows, upon activation and deactivation of said actuator, said common valve arm to pivot solely about an elastomeric bearing surface provided by said elastic seal ring.

2. A valve according to claim 1, wherein said valve bodies are made by partially raising the elastic sheathing layer of the valve arm.

3. A valve according to claim 2, wherein said valve bodies are provided on front ends of the two legs of the valve arm in the valve chambers.

4. A valve according to claim 1, wherein said valve arm is inserted in the seal ring at a middle of the seal ring in the thickness direction thereof.

5. A valve according to claim 1, wherein said selection ports comprise high pressure ports and low pressure ports.

6. A valve according to claim 1, wherein said actuator is a solenoid actuator.

7. A valve according to claim 6, wherein said solenoid actuator comprises a solenoid plunger which is connected to the common valve arm.

8. A valve according to claim 1, further comprising valve seats positioned in the openings of said respective selection valve ports and having fluid passageways therethrough which define an internal diameter in said valve seats which is smaller in cross-sectional area than the fluid passageways defined by said valve ports; a portion of each of said valve seats extending into said chamber and being of constricting cross-sectional area such that the tip or end of said valve seat has a diameter essentially equal to the internal diameter of said valve seats, whereby said valve bodies come into contact with the corresponding valve seats to selectively close the same, in accordance with the swing movement of said valve arm.

9. A directional control valve according to claim 1, further comprising valve seats one each of which is positioned within the opening of each of said selection valve ports, said valve seats each having a fluid passageway therethrough which defines an internal diameter in said valve seats which is smaller in cross-sectional area than the fluid passageways defined by said valve ports, a portion of each of said valve seats extending into said chamber and being of constricting cross-sectional area in the direction of fluid flow, such that the end of each of said valve seats, within the valve chamber, has a diameter essentially equal to the internal diameter of said valve seats.

* * * * *